No. 784,640.

Patented March 14, 1905.

UNITED STATES PATENT OFFICE.

ROBERT SUCHY, OF GRIESHEIM-ON-THE-MAIN, GERMANY, ASSIGNOR TO CHEMISCHE FABRIK GRIESHEIM ELECTRON, OF FRANKFORT-ON-THE-MAIN, GERMANY.

PROCESS OF MAKING CHROMATES.

SPECIFICATION forming part of Letters Patent No. 784,640, dated March 14, 1905.

Application filed July 16, 1903. Serial No. 165,839.

*To all whom it may concern:*

Be it known that I, ROBERT SUCHY, a subject of the Emperor of Austria-Hungary, residing and having my post-office address at 1 Tahnstrasse, Griesheim-on-the-Main, Germany, have invented certain new and useful Improvements in Rendering Soluble Chrome-Ironstone, of which the following is a specification.

The process forming the object of the present invention has for its purpose to make chromates from chrome-ironstone (and more especially potassium chromate) more cheaply and more readily than by the processes hitherto known.

The extraversion of the ore of chromium was hitherto effected by mixing the finely pulverized material with a large amount of carbonate of soda and lime or of carbonate of potash and lime and subjecting the mixture to a high temperature. Saltpeter was also frequently added as oxidizing agent. (See Dammor III, 539.) It has, however, been found that such high temperatures are not at all necessary, if in lieu of the aforementioned chemicals caustic potash is allowed to act on the chrome-ironstone and a liberal supply of air is provided. For analytical purposes a mixture of caustic soda and caustic potash has often been proposed for the extraversion of chromium ore. This, however, requires the use of a blast. While, as already stated, the processes hitherto known required a temperature of over $1,000°$ centigrade, the extraversion by means of caustic potash takes place already at about $300°$ centigrade, as trials have already shown. The more energetic oxidizing action of the caustic potash as compared with that of caustic soda, carbonate of soda, or of potash and the like is in any case attributable to the fact that molten KOH absorbs oxygen from the air and forms a superoxid which is a much more effectual oxidizing agent than the aforementioned substances. Although caustic potash is more costly than the aforesaid substances, this is for the present process of no importance, as it is possible, as shown hereinafter, to recover all the caustic potash that has not been transformed into chromate as caustic-potash lye or carbonate of potash. This fact, together with the low temperature and the consequent large saving of fuel, renders it possible to carry out the process cheaply in spite of the high cost of caustic potash.

The process is carried out as follows: Finely-pulverized chrome-ironstone and caustic potash in the form of a lye of $50°$ Baumé are heated and energetically stirred in a suitable furnace in the proportion of one hundred to two hundred and fifty, by weight. The oxidation begins, as already stated, at $300°$ centigrade and goes on smoothly and completely at $500°$. The melt obtained is yellow green and is lixiviated and freed of impurities (aluminates and silicates) by the addition of lime or by passing carbon dioxid through it. After filtration the lye, which contains only potassium chromate and caustic potash or carbonate of potash, is evaporated, the potassium chromate being almost entirely precipitated, while the excess of KOH remains as potash lye or carbonate of potash and may be utilized for a further operation or other purposes. The salt can be readily extracted with a little water.

It will be seen that the process runs smoothly and yields an almost chemically pure product and but few waste products, being in this respect far superior to the methods hitherto known, in which the lixiviation of the highly-heated melts presented considerable difficulties.

Having now particularly described and ascertained the nature of this invention and in what manner the same is to be performed, I declare that what I claim is—

1. The process of making chromates, which consists in subjecting a mixture of pulverized chrome ore and caustic potash to a temperature not exceeding $500°$ centigrade in the presence of air, and agitating the mixture during the period of heating.

2. The process of making chromates which consists in subjecting a mixture of pulverized chrome ore and a caustic-potash lye of $50°$ Baumé, in substantially the proportions of one hundred to two hundred and fifty by weight, to a temperature not exceeding 500° centigrade in the presence of air, and agitating the mixture during the period of heating.

3. The process of making chromates, which consists in subjecting a mixture of pulverized chrome ore and caustic potash to a temperature not exceeding 500° centigrade in the presence of air, agitating the mixture during the period of heating, lixiviating the melt and freeing it from impurities, and separating the chromate from the lye by evaporation.

In testimony whereof I have signed my name to this specification in the presence of two subscribing witnesses.

ROBERT SUCHY.

Witnesses:
FRANZ HASSLACHER,
MICHAEL VOLKE.